(12) United States Patent
Filipovic et al.

(10) Patent No.: US 10,300,544 B2
(45) Date of Patent: May 28, 2019

(54) MACHINING AND MANUFACTURING SYSTEMS AND METHOD OF OPERATING THE SAME

(71) Applicant: General Electric Company, Schenectady, NY (US)

(72) Inventors: Dragan Filipovic, Bavaria (DE); Mathias Ernst Messmer, Bavaria (DE); Simon Josef Würzinger, Bavaria (DE)

(73) Assignee: General Electric Company, Schenectady, NY (US)

( * ) Notice: Subject to any disclaimer, the term of this patent is extended or adjusted under 35 U.S.C. 154(b) by 229 days.

(21) Appl. No.: 15/162,309

(22) Filed: May 23, 2016

(65) Prior Publication Data

US 2017/0334008 A1   Nov. 23, 2017

(51) Int. Cl.
| | | |
|---|---|---|
| *B23H 7/32* | (2006.01) | |
| *B23H 7/28* | (2006.01) | |
| *B23H 7/30* | (2006.01) | |
| *B23H 1/04* | (2006.01) | |
| *B23H 9/10* | (2006.01) | |
| *B23H 5/02* | (2006.01) | |

(52) U.S. Cl.
CPC ............ *B23H 7/28* (2013.01); *B23H 1/04* (2013.01); *B23H 7/30* (2013.01); *B23H 7/32* (2013.01); *B23H 9/10* (2013.01); *B23H 5/02* (2013.01); *B23H 2400/10* (2013.01)

(58) Field of Classification Search
None
See application file for complete search history.

(56) References Cited

U.S. PATENT DOCUMENTS

| 3,218,248 A | * | 11/1965 | Williams | ................. | B23H 3/08 |
|---|---|---|---|---|---|
| | | | | | 204/224 M |
| 3,440,156 A | * | 4/1969 | Dickson | ................... | B23H 3/02 |
| | | | | | 204/224 M |
| 4,101,405 A | * | 7/1978 | Inoue | ....................... | B23C 1/12 |
| | | | | | 204/224 M |

(Continued)

FOREIGN PATENT DOCUMENTS

| JP | 51115398 A | 10/1976 |
|---|---|---|
| JP | H10-315056 A | 12/1998 |

(Continued)

OTHER PUBLICATIONS

International Search Report and Written Opinion issued in connection with corresponding PCT Application No. PCT/US17/031051 dated Aug. 10, 2017.

(Continued)

*Primary Examiner* — Stefanie S Wittenberg
(74) *Attorney, Agent, or Firm* — Ziolkowski Patent Solutions Group, SC

(57) ABSTRACT

An electromachining system includes at least one steerable electrode. The steerable electrode includes an electrode positioning mechanism configured to facilitate six degrees of freedom referenced to a pitch axis, a yaw axis, and a roll axis. The three axes are substantially perpendicular to each other. The electrode positioning mechanism includes a first end and a rotatable electrode tip coupled to the first end.

15 Claims, 13 Drawing Sheets

(56) References Cited

U.S. PATENT DOCUMENTS

| | | | |
|---|---|---|---|
| 4,988,425 A * | 1/1991 | Everhart | B23H 9/16 |
| | | | 204/224 M |
| 5,951,884 A | 9/1999 | Futamura | |
| 7,394,040 B2 | 7/2008 | Wei et al. | |
| 7,741,576 B2 | 6/2010 | Trimmer et al. | |
| 8,581,136 B2 | 11/2013 | Kishimoto et al. | |
| 2009/0001053 A1 | 1/2009 | Luo et al. | |
| 2010/0051588 A1 | 3/2010 | Li et al. | |
| 2011/0255976 A1 | 10/2011 | Jahnen | |
| 2013/0319974 A1 | 12/2013 | Metzner | |
| 2014/0042128 A1 | 2/2014 | Feng et al. | |

FOREIGN PATENT DOCUMENTS

| | | |
|---|---|---|
| JP | 2003260617 | 9/2003 |
| KR | 100561204 B1 | 3/2006 |
| WO | 2009052841 A1 | 4/2009 |
| WO | 2017/058623 A1 | 4/2017 |

OTHER PUBLICATIONS

K. Liu et al., Influence of the pulse shape on the EDM performance of Si3N4—TiN ceramic composite, CIRP Annals—Manufacturing Technology, vol. 58, Issue: 1, pp. 217-220, 2009.

Singh et al., "Fabrication and Machining of Metal Matrix Composites: A Review", Materials and Manufacturing Processes, Mar. 23, 2015.

Zhao, W. et al., "A Novel High Efficiency Electrical Erosion Process—Blasting Erosion Arc Machining," Seventeenth International Symposium on Electro machining, Procedia CIRP 6, 2013, pp. 621-625.

* cited by examiner

MACHINING AND MANUFACTURING SYSTEMS AND METHOD OF OPERATING THE SAME

BACKGROUND

The field of the disclosure relates generally to machining and manufacturing systems and, more particularly, to steerable electrodes for electromachining systems and massive parallel manufacturing systems.

At least some known modern machines include components, e.g., and without limitation, compressor impellers for gas turbine engines, that are manufactured from a single piece of metal through highly subtractive bulk material removal and finished through precision material removal using known machining processes such as computer numerical control (CNC) milling machines. CNC milling machines typically use carbide cutting blades guided through a computer programmed with computer aided design (CAD) software. Further, many of these known modern machines achieve higher performance than their predecessors through the manufacture of at least some of the machines' components from superalloys that are light, strong, and resistant to high operating temperatures, thereby extending the service life of such components to in excess of ten years. These superalloys include materials such as austenite nickel-chromium-based superalloys, i.e., Inconel® that are difficult to cut and machine using standard machining/milling equipment and methods. Therefore, traditional scraping-away methods using such devices as CNC milling machines have been slowed substantially to preserve the service life of carbide cutting blades. Such a slowdown extends component manufacturing time and raises manufacturing costs. Some known machining systems have had their carbide cutting blades replaced with an electric discharge head, which has accelerated the component manufacturing process.

As mentioned above, once the bulk material removal portion of the component manufacturing process is complete, more precise material removal methods are used to define the often complicated and proprietary three-dimensional (3D) configurations and geometries, e.g., internal fluid passages, that enhance the operating efficiencies of the components. This second step further extends the manufacturing time and expenses associated with the components. Moreover, many of these known components are large in size, e.g., some impellers are 2.5 meters (m) (8.2 feet (ft.)) in diameter. Therefore, due to a combination of the size of the components, the enhanced hardness of the superalloys, and the precision finishing required, many of these known components take on the order of weeks to manufacture.

BRIEF DESCRIPTION

In one aspect, an electromachining system is provided. The electromachining system includes at least one steerable electrode. Each steerable electrode includes an electrode positioning mechanism configured to facilitate six degrees of freedom referenced to a pitch axis, a yaw axis, and a roll axis. The three axes are substantially perpendicular to each other. The electrode positioning mechanism includes a first end and a rotatable electrode tip coupled to the first end.

In a further aspect, a method of manufacturing an object is provided. The method includes using an electromachining system including at least one steerable electrode including an electrode positioning mechanism and a rotatable electrode tip coupled to the electrode positioning mechanism. The method also includes exercising the electrode positioning mechanism though a predetermined transit path through the object in at least one of a pitch direction, a yaw direction, and a roll direction. The method further includes removing at least a portion of the object along the predetermined transit path comprising rotating the electrode tip.

In another aspect, a parallel manufacturing system is provided. The parallel manufacturing system includes a plurality of steerable electrodes. Each steerable electrode of plurality of steerable electrodes includes an electrode positioning mechanism configured to facilitate six degrees of freedom referenced to a pitch axis, a yaw axis, and a roll axis. The three axes are substantially perpendicular to each other. The electrode positioning mechanism includes a first end and a rotatable electrode tip coupled to the first end. The electrode positioning mechanism also includes at least one controller configured to dynamically alter one or more of a shape and an orientation of each steerable electrode and a value of electric current transmitted through each steerable electrode, thereby removing material from an object through a plurality of predetermined transit paths through the object substantially simultaneously.

DRAWINGS

These and other features, aspects, and advantages of the present disclosure will become better understood when the following detailed description is read with reference to the accompanying drawings in which like characters represent like parts throughout the drawings, wherein.

Figure 1:
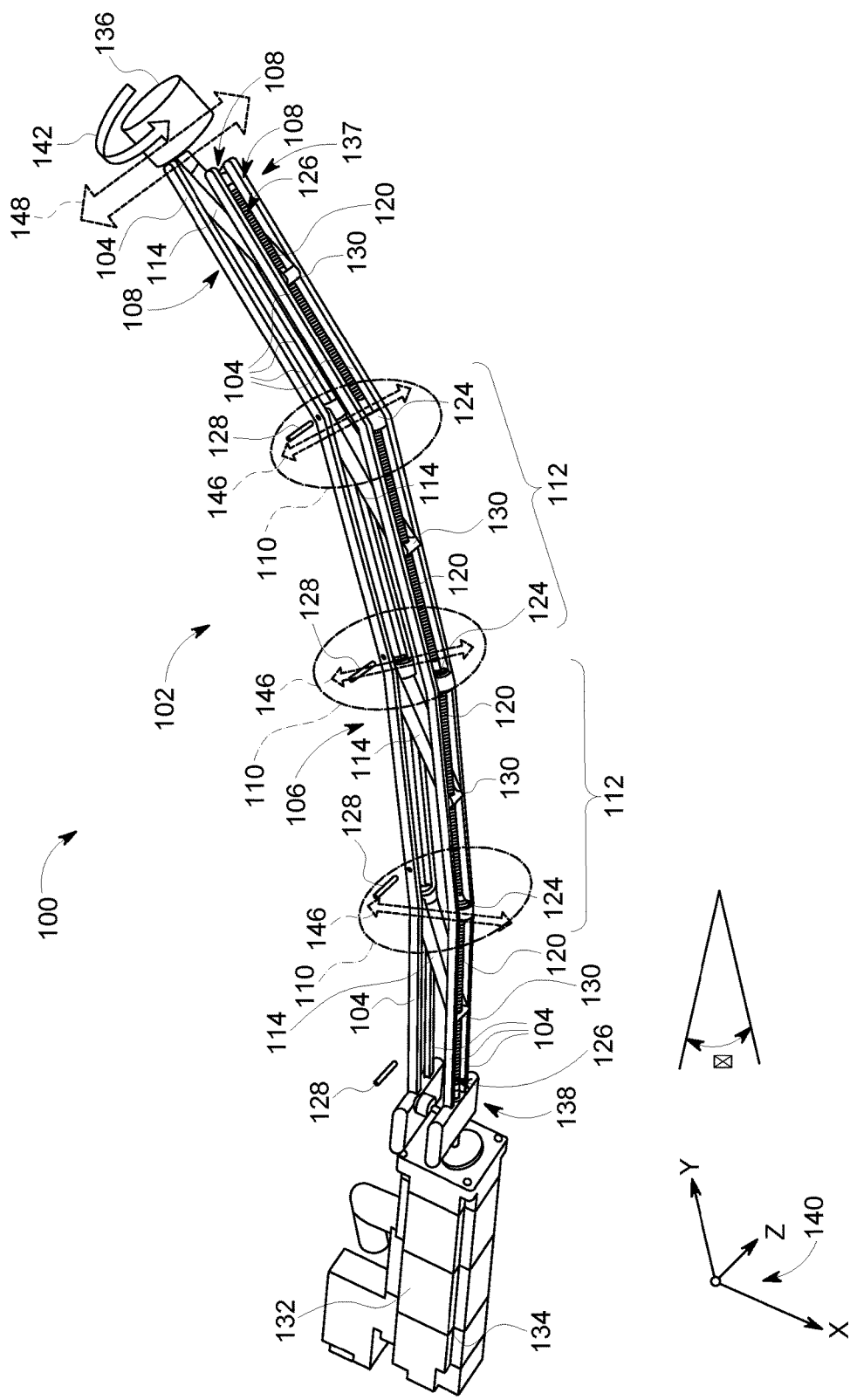
FIG. 1 is a schematic view of a portion of an exemplary steerable electrode.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, a programmable logic controller (PLC), and application specific integrated circuit, and other programmable circuits, and these terms are used interchangeably herein. In the embodiments described herein, memory may include, but it not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method of technology for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including without limitation, volatile and non-volatile media, and removable and non-removable media such as firmware, physical and virtual storage, CD-ROMS, DVDs, and any other digital source such as a network or the Internet, as well as yet to be developed digital means, with the sole exception being transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Moreover, as used herein, the term "electromachining" refers to the application of electric energy, rather than mechanical methods, to a workpiece to affect removal of workpiece material as at least a portion of a manufacturing process requiring bulk material removal, for example, and without limitation, compressor impeller manufacturing. Examples of electromachining include, without limitation, electrical discharge machining (EDM), electrochemical discharge machining (ECDM) (a hybrid combination of electrochemical machining (ECM) and EDM), and high-speed electro-erosion (HSEE). One example of an HSEE process is, without limitation, General Electric's BlueArc™.

The steerable electrodes for the electromachining systems and the massive parallel manufacturing systems disclosed herein facilitate significant acceleration of manufacturing complex components, such as compressor impellers. Specifically, the steerable electrodes disclosed herein facilitate changing the position and orientation of the electrode dynamically. More specifically, as the electrode penetrates the superalloy material, the bending of the associated electrode positioning, i.e., arm mechanism is performed through a plurality of links serially coupled through actuated joints, thereby leveraging six degrees of freedom in three-dimensional space through parallel kinematics of a robotic arm. As such, the steerable electrode facilitates forming passages and bends within components for substantially any angle. Also, the electrodes are configured to carry in excess of 500 amperes (amps), thereby increasing the rapidity of material removal during the roughing process. Moreover, the tips of the steerable electrodes are rotatable, thereby further increasing the rate of material removal. The flexible electrode arm mechanism has a predetermined rigidity that facilitates sufficiently precise positioning of the rotatable electrode tip for bulk material removal from the workpiece without inadvertent material removal.

Furthermore, the steerable electrodes are controllable through a computer such that the steerable electrodes are easily adaptable to a large number of components with different configurations and geometries. As such, the electromachining systems described herein facilitate controllable electromachining drilling and pocketing. Also, the use of two independent servomotors, i.e., one servomotor for operating the curvature of the robotic arm and a second servomotor to rotate the electrode facilitates, with minor end effector modifications to the arms and the remainder of the system, the embodiments described herein may be applied to other (manual) machining processes, e.g., polishing of the interior walls of impeller vanes and surface inspection methods including optical, Eddy-current, and x-ray. Also, the massive parallel manufacturing system uses a plurality of steerable electrodes such that electromachining is simultaneously deployed to, e.g., all vanes for an impeller through drilling and pocketing, thereby further decreasing the manufacturing time for the roughing process for such impellers. For example, and without limitation, a 2.5 meter diameter impeller may be manufactured from a blank workpiece through removing approximately 90% of the material needed to finish machining the impeller in approximately two to three days rather than the present three weeks.

FIG. 1 is a schematic view of a portion of an exemplary steerable electrode 100. Steerable electrode 100 facilitates bulk material removal from substantially solid, block-formed objects, i.e., blank objects referred to as a workpiece, where the workpieces are formed from superalloys such as, without limitation, nickel-based (e.g., Hastelloy® and Inconel®), cobalt-based, iron-based, and titanium-based. Such bulk material removal is aggressively achieved through one or more electromachining processes with very high electrical currents, i.e., in the range inclusive of approximately 200 amperes (amps) and approximately 2000 amps transmitted through steerable electrode 100 to electrically erode the workpiece. Such aggressive bulk material removal facilitates timely forming of a roughly-shaped object that resembles the final product, e.g., and without limitation, a pump impeller, where subsequently the roughly-shaped object is transferred to a more precise machining process for final fabrication. As used herein, the term "electromachining system" is a system including one or more steerable electrodes 100. Therefore, an electromachining system may be defined with one steerable electrode 100.

In the exemplary embodiment, steerable electrode 100 includes an electrode positioning mechanism 102 that emulates a robotic arm configured to manipulate steerable electrode 100 through six degrees of freedom in three-dimensional space through leveraging parallel kinematics of steerable electrode 100. Electrode positioning mechanism 102 includes a plurality of short flexible spline segments 104 arranged to define a flexible, parallel kinematic frame structure 106. Each spline segment 104 is substantially square in cross-sectional profile. Alternatively, short flexible spline segments 104 have any shape and cross-sectional profile that enables operation of steerable electrode 100 and electrode positioning mechanism 102 as described herein, including, without limitation, tubular. A flexible outer sheathing (not shown) is extended over spline segments 104.

Also, in the exemplary embodiment, frame structure 106 includes four frame strings 108 defining a configuration that transitions between a substantially rectangular profile and a substantially trapezoidal profile through kinematic motion. Alternatively, frame structure 106 includes any number of frame strings 108 that enables operation of steerable electrode 100, electrode positioning mechanism 102, and kinematic frame structure 106 as described herein. Each spline segment 104 is coupled to at least one adjacent spline segment 104 through a flexible joint mechanism 110. Each set of associated spline segments 104 extending between opposing flexible joint mechanisms 110 defines a substantially quadrilateral frame segment 112. Four frame segments 112 are shown in FIG. 1 (with only two labeled for clarity). Alternatively, electrode positioning mechanism 102 includes any number of quadrilateral frame segments 112 that enables operation of steerable electrode 100, electrode positioning mechanism 102, and kinematic frame structure 106 as described herein.

Figure 2:
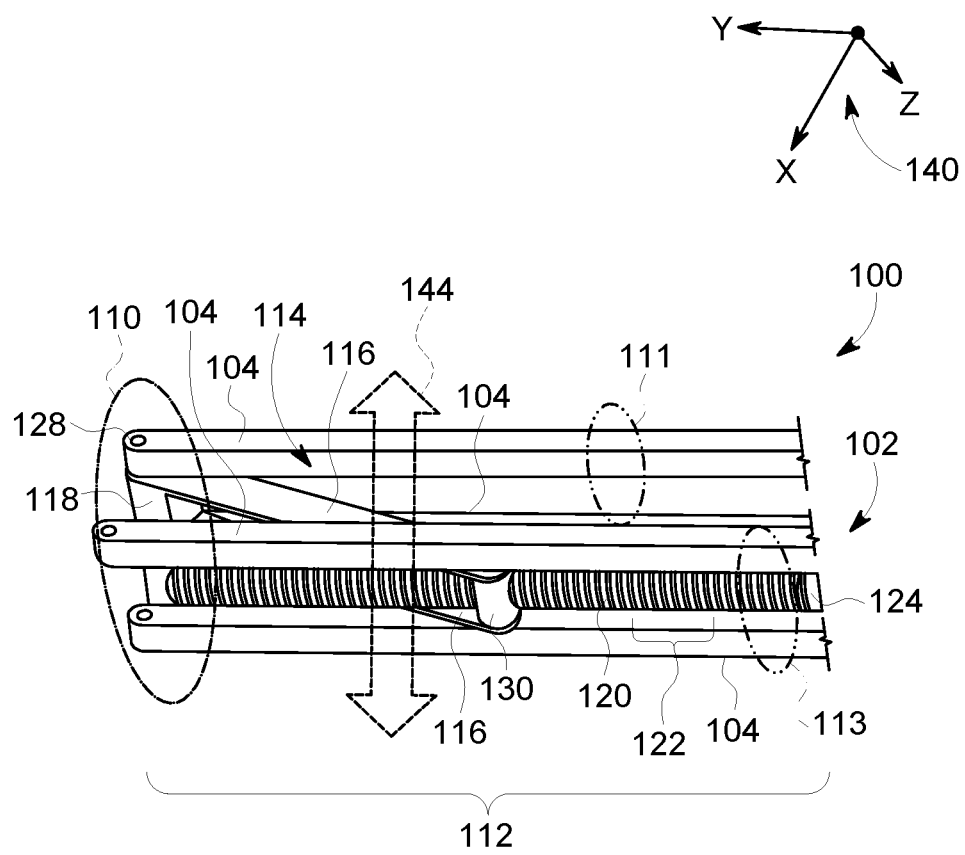
FIG. 2 is a schematic view of an exemplary frame segment that may be used with the steerable electrode shown in FIG. 1.

FIG. 2 is a schematic view of one exemplary frame segment 112 that may be used with steerable electrode 100. Each frame segment 112 includes four spline segments 104. Each frame segment 112 also includes a truss member 114 extending diagonally between a first pair 111 of spline segments 104 and a second pair 113 of spline segments 104. Truss member 114 includes two substantially parallel truss bars 116 with a truss cross-member 118 coupled to both truss bars 116 and first pair 111 of spline segments 104 through flexible joint mechanism 110.

Referring to FIGS. 1 and 2, electrode positioning mechanism 102 also includes a plurality of leadscrew segments 120 extending longitudinally through each frame segment 112. Each leadscrew segment 120 includes threads 122 with a predetermined thread pitch that enables operation of steerable electrode 100, electrode positioning mechanism 102, and kinematic frame structure 106 as described herein. Leadscrew segments 120 are coupled to adjacent leadscrew segments 120 along the longitudinal length of electrode positioning mechanism 102 through a short flexible coupler 124 to define a leadscrew mechanism 126 extending through kinematic frame structure 106. Each flexible coupler 124 is positioned proximate each flexible joint mechanism 110 to facilitate bending of leadscrew mechanism 126 with bending of kinematic frame structure 106.

Also, in the exemplary embodiment, each flexible joint mechanism 110 includes a joint bearing 128 pivotably coupling truss member 114 to first pair 111 of spline segments 104. Joint bearing 128 extends through truss cross-member 118 and truss bars 116 as well as to first pair 111 of spline segments 104. In some embodiments, flexible joint mechanism 110 also includes mechanical coupling devices that secure joint bearing 128 in place such as and without limitation, acorn nuts, shaft caps, and cotter pins (neither shown).

Further, in the exemplary embodiment, truss member 114 includes a nut bearing 130 pivotably coupled to truss bars 116 through devices that include, without limitation, a device (not shown) similar to joint bearing 128. Also, nut bearing 130 includes threads (not shown) configured to mate and threadedly engage with threads 122 such that each nut bearing 130 rides through threads 122 of the associated leadscrew segment 120.

Referring to FIG. 1, steerable electrode 100 includes at least one electrode positioning mechanism drive device, i.e., leadscrew servomotor 132 drivingly coupled to leadscrew mechanism 126. Leadscrew servomotor 132 is protectively housed within a shroud 134 and is reversible. Moreover, steerable electrode 100 includes a rotatable electrode tip 136 (described further below). Therefore, frame strings 108 and leadscrew mechanism 126 extend from servomotor 132 to electrode tip 136. Electrode positioning mechanism 102 includes a first end 137 coupled to rotatable electrode tip 136 and a second end 138 coupled to leadscrew servomotor 132. A flexible outer sheathing (not shown) is extended over spline segments 104 from first end 137 to second end 138.

In the exemplary embodiment, electrode positioning mechanism 102 (the arm) is approximately 75 millimeters (mm) (2.95 inches (in.)) in cross-section in the X-Z plane, leadscrew segment 120 is approximately 3 mm (0.12 in.) in diameter, and rotatable electrode tip 136 is approximately 30-40 mm (1.18 in.-1.57 in.) in diameter. Alternatively, electrode positioning mechanism 102, leadscrew segment 120, and rotatable electrode tip 136 have any dimensions that enable operation of steerable electrode 100 as described herein, for example, and without limitation, 5 mm-10 mm (0.2 in.-0.4 in.) in diameter for electrode positioning mechanism 102 for smaller machining tasks.

In operation, and again referring to FIGS. 1 and 2, steerable electrode 100 removes bulk material removal from a workpiece (not shown in FIGS. 1 and 2) with very high electrical currents, i.e., in the range inclusive of approximately 200 amperes (amps) and approximately 2000 amps transmitted through steerable electrode 100 to rotatable electrode tip 136 to electrically erode the workpiece. Such aggressive bulk material removal facilitates timely forming of a roughly-shaped object that resembles the final product, e.g., and without limitation, a pump impeller, where subsequently the roughly-shaped object is transferred to a more precise machining process for final fabrication. To further facilitate the discussion of steerable electrode 100 herein, a coordinate system 140 is shown with a pitch axis, i.e., x-axis, a roll axis, i.e., y-axis, and a yaw axis, i.e., z-axis, each axis orthogonal to the other two axes. For reference, leadscrew servomotor 132 is shown oriented at an acute angle $\theta$ with respect to the y-axis. In some embodiments, angle $\theta$ is approximately 45 degrees. Rotatable electrode tip 136 is rotated as shown by direction arrow 142 as described further below.

Specifically, in operation, leadscrew servomotor 132 is electrically energized to induce rotational motion in leadscrew mechanism 126. Such rotational motion is reversible. As each leadscrew segment 120 rotates, the associated nut bearing 130 slides along threads 122 of leadscrew segment 120 in a direction at least partially parallel to the y-axis. Such movement of nut bearing 130 along leadscrew segment 120 induces pivoting translation 144 of the remainder of truss member 114 in the x-y plane as defined by the x-axis and the y-axis. More specifically, as nut bearing 130 slides to the right in FIG. 2, first pair 111 of spline segments 104 translates toward second pair 113 of spline segments 104. Conversely, as nut bearing slides to the left in FIG. 2, first pair 111 of spline segments 104 translates away from second pair 113 of spline segments 104. Referring to FIG. 1, such translating of spline segments 104 results in translation 146 of each frame segment 112 individually with respect to the associated flexible joint mechanism 110. The resulting sum of each translation 146 results in the translation 148 of rotatable electrode tip 136.

Also, in operation, values for the dimensions of translations 144, 146, 148 depend on the length of each frame segment 112, the length of each truss member 114, the permissible travel length of each nut bearing 130 along the associated leadscrew segment 120, and the thread pitch on each leadscrew segment 120 and nut bearing 130. In some embodiments, some of leadscrew segments 120 include travel stops to limit the travel of nut bearing 130 thereon. Also, in some embodiments, each frame segment 112 and leadscrew segment 120 has substantially similar lengths and thread pitches to facilitate substantially similar magnitudes of translations. Alternatively, in some embodiments, each frame segment 112 and leadscrew segment 120 has different lengths and/or thread pitches to facilitate different magnitudes of translations.

Figure 3:
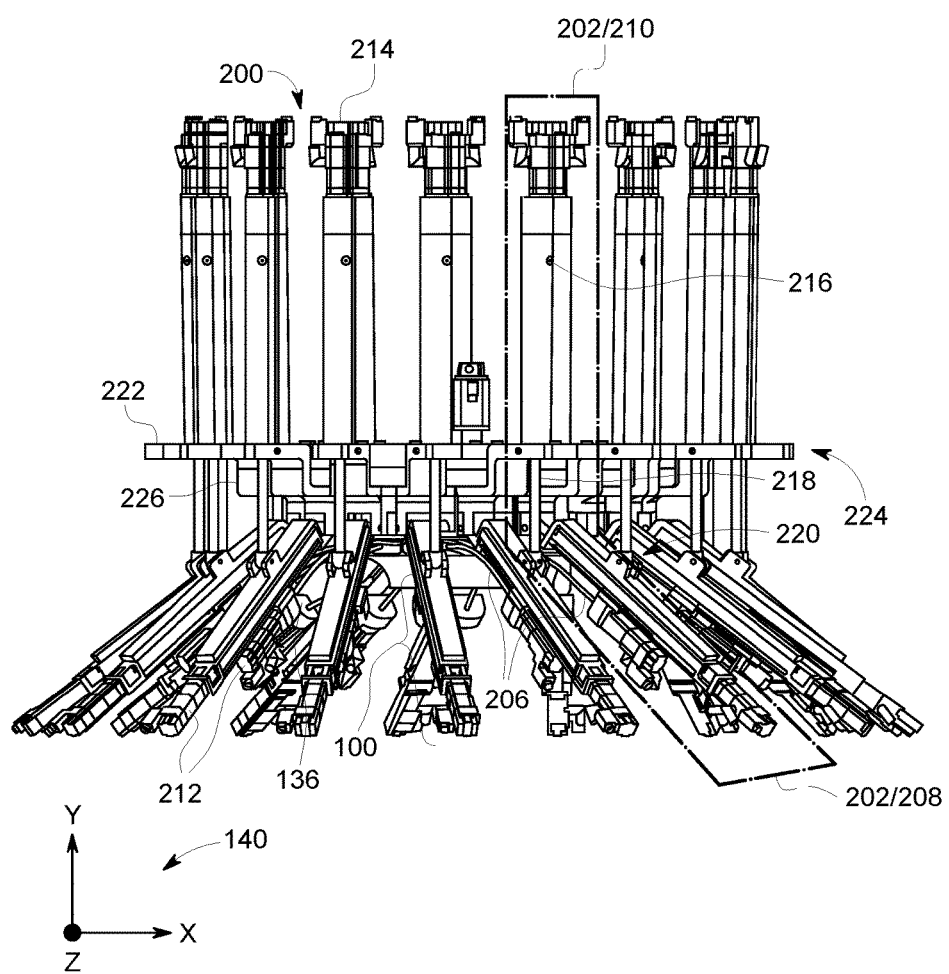
FIG. 3 is schematic side view of an exemplary massive parallel manufacturing system that may use a plurality of the steerable electrodes shown in FIG. 1.
Figure 4:
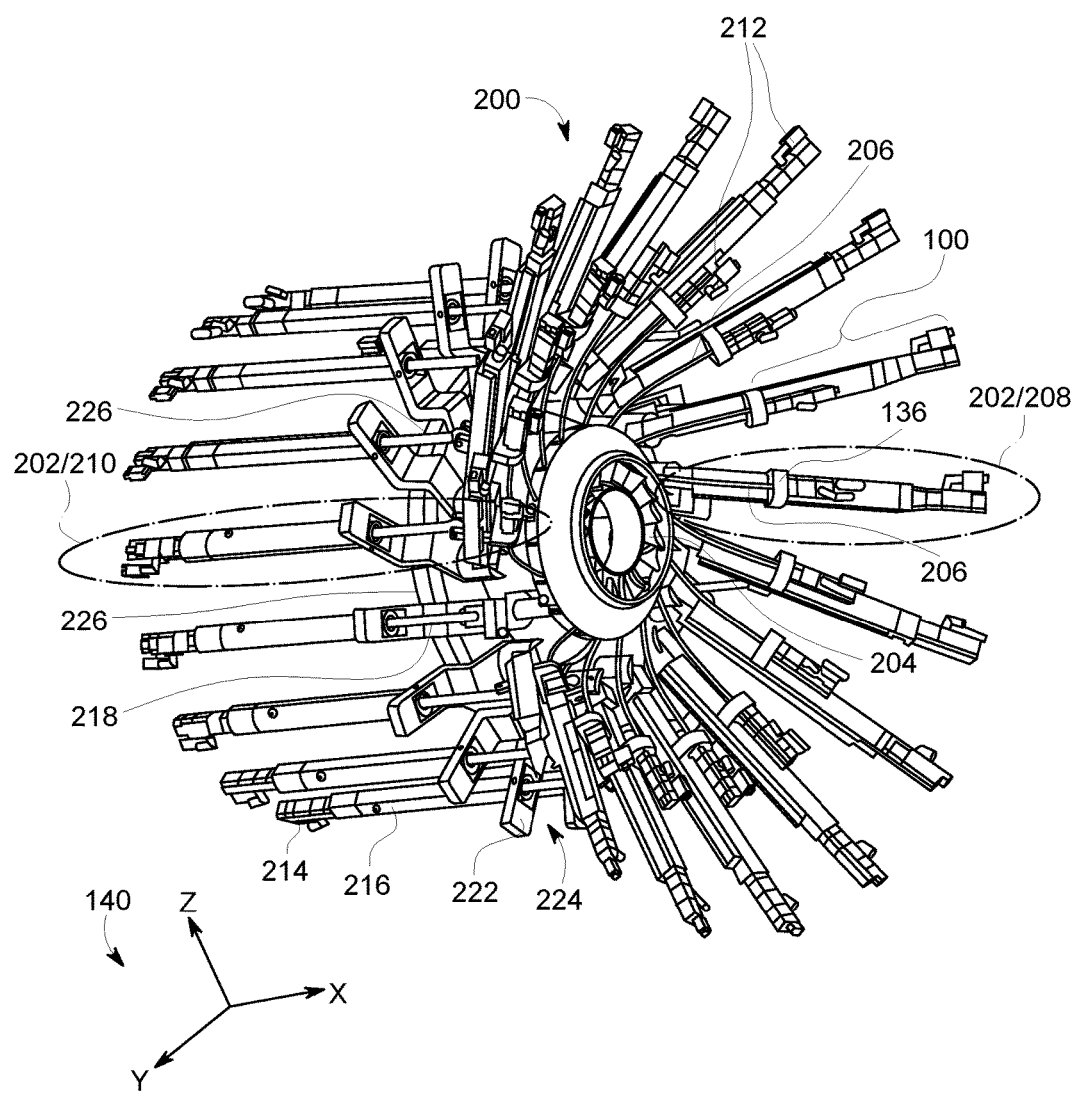
FIG. 4 is schematic perspective view of the massive parallel manufacturing system shown in FIG. 3 with an exemplary impeller manufactured therein.
Figure 5:
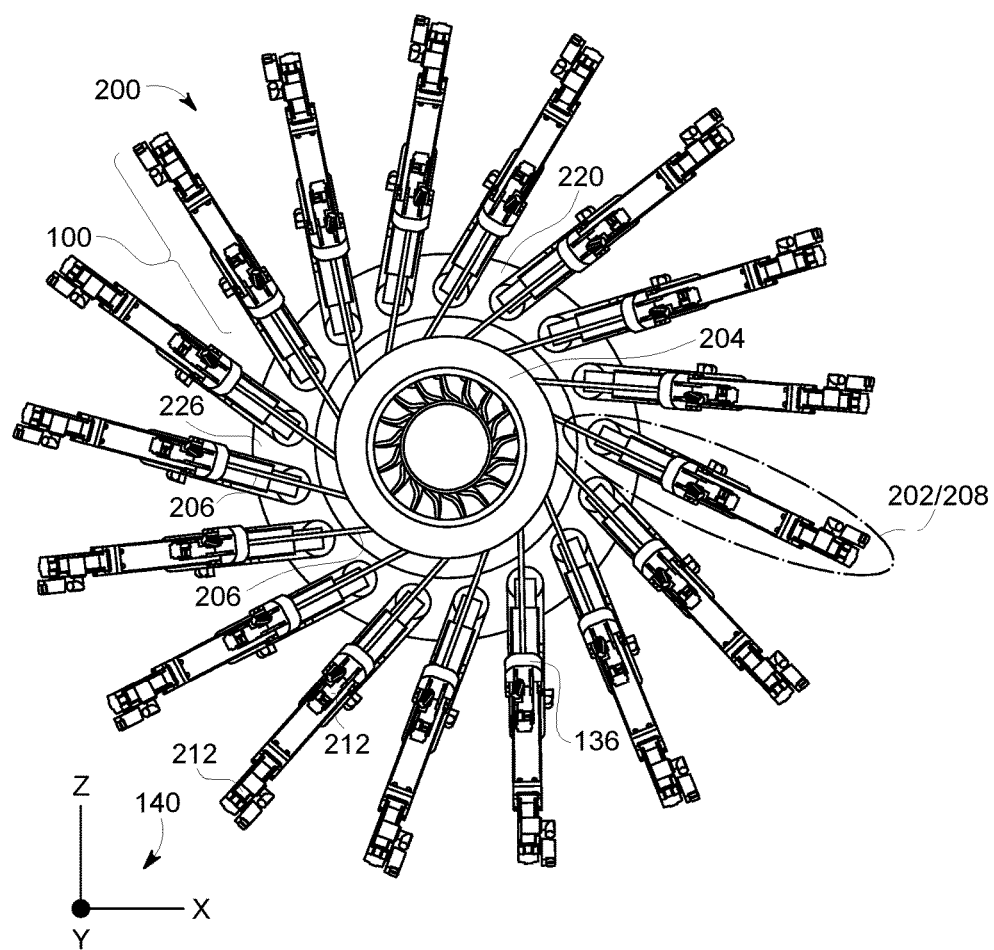
FIG. 5 is a schematic bottom view of the massive parallel manufacturing system with the impeller therein, both shown in FIG. 4.
Figure 6:
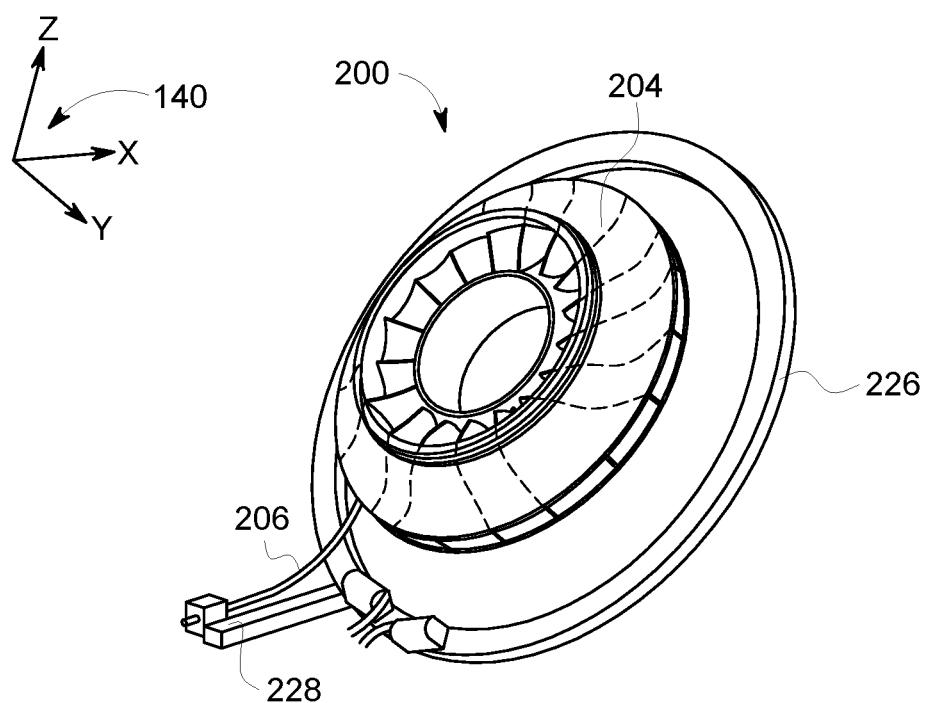
FIG. 6 is a schematic perspective view of the impeller positioned within a portion of the massive parallel manufacturing system, both shown in FIGS. 3 and 4.

FIG. 3 is schematic side view of an exemplary massive parallel manufacturing system 200 that may use a plurality of steerable electrode positioning mechanisms 202. FIG. 3 is substantially representative of the configuration of massive parallel manufacturing system 200 within a manufacturing facility, where the floor (not shown) is substantially parallel to the x-axis. FIG. 4 is schematic perspective view of massive parallel manufacturing system 200 with an exemplary impeller 204 manufactured therein. FIG. 5 is a schematic bottom view of massive parallel manufacturing system 200 with impeller 204 therein. FIG. 6 is a schematic perspective view of impeller 204 positioned within a portion of massive parallel manufacturing system 200.

In the exemplary embodiment, massive parallel manufacturing system 200 is a dual-ring, multi-electrode electromachining system that includes 15-20 steerable electrode positioning mechanisms 202 (17 shown, only one labeled in FIG. 3, and only a portion of one labeled in each of FIGS. 4 and 5). Each steerable electrode positioning mechanism 202 manipulates one of 15-20 flexible, steerable electrodes 206 (17 shown, only two labeled in each of FIGS. 3, 4, and 5) to partially form impeller 204. Alternatively, massive parallel manufacturing system 200 includes any number of steerable electrode positioning mechanisms 202 that enables operation of massive parallel manufacturing system 200 as described herein, including, without limitation, a single steerable electrode positioning mechanisms 202. As such, massive parallel manufacturing system 200 is fully scalable for a wide variety of machining tasks. Alternatively, rather than steerable electrode positioning mechanisms 202, in some embodiments, massive parallel manufacturing system 200 includes a plurality of electrode positioning mechanisms 102 (shown in FIG. 1).

Also, in the exemplary embodiment, each steerable electrode positioning mechanism 202 has two portions, i.e., a first portion 208 and a second portion 210. In general, first portion 208 is substantially similar to steerable electrode 100. However, first portion includes one through four servomotors drive devices, i.e., 212 (two shown in FIGS. 3, 4, and 5). Second portion 210 is substantially parallel to the y-axis and includes one drive device, i.e., servomotor 214. Alternatively, first portion 208 and second portion 210 have any number of servomotors 212 and 214, respectively, that enable operation of steerable electrode positioning mechanism 202 as described herein. Servomotors 212 and 214 are reversible. Second portion 210 of steerable electrode positioning mechanism 202 also includes a positioning cylinder 216 operatively coupled to servomotor 214. Servomotor 214 and positioning cylinder 216 at least partially define any type of electro-mechanical system that enables operation of steerable electrode positioning mechanism 202 and massive parallel manufacturing system 200 as described herein, including, without limitation, geared drive, hydraulic, and pneumatic. Second portion 210 also includes a positioning rod 218 coupled to first portion 208 through a pair of dowel-type coupling devices 220. Second portion 210 positions first portion 208 through a predetermined range of arc by adjusting the length of rod 218 in the y-axis dimension.

Further, in the exemplary embodiment, massive parallel manufacturing system 200 includes a plurality of support guide members 222 that defines a support guide ring 224. Massive parallel manufacturing system 200 also includes an electrode support ring 226 that supports second portion 210 of steerable electrode positioning mechanism 202. Support guide ring 224 and electrode support ring 226 are the reason for the "dual-ring" description for system 200. An electrode support bracket 228 (only one shown in FIG. 6) for each electrode 206 is coupled to electrode support ring 226.

In operation, massive parallel manufacturing system 200 uses at least one of electrical discharge machining (EDM), electrochemical discharge machining (ECDM), and high-speed electro-erosion (HSEE). As such, a blank workpiece (not shown) is secured to massive parallel manufacturing system 200 though any means that enables operation of system 200 as described herein. One or more flexible, steerable electrodes 206 use very high electrical currents, i.e., in the range inclusive of approximately 200 amps and approximately 2000 amps transmitted through each steerable electrode 206 to electrically erode the workpiece, thereby effecting bulk material removal from the workpiece until a roughly-shaped object that resembles the final product, e.g., and without limitation, a pump impeller is formed.

Also, in operation, second portion 210 regulates positioning of associated electrode 206 with respect to the y-axis. First portion 208 regulates positioning of electrode 206 with respect to the x-axis and the z-axis in a manner substantially similar to that described for steerable electrode 100 (shown in FIGS. 1 and 2). As such, each steerable electrode positioning mechanism 202 exercises associated steerable electrode 206 though a predetermined transit path through the workpiece leveraging six degrees of freedom, i.e., in at least one of the pitch direction, the roll direction, and the yaw direction (x-axis, y-axis, and z-axis, respectively) through removing at least a portion of the workpiece along the predetermined transit path.

Further, in operation, each electrode positioning mechanism 202 exercises associated steerable electrode 206 though the predetermined transit paths though drilling and pocketing, where drilling, as used herein, describes boring a single hole within the workpiece for a predetermined distance to define a bore hole with a substantially consistent borehole diameter. Such boreholes are typically curved with respect to at least one of the x, y, and z-axes of coordinate system 140. In contrast, pocketing, as used herein, describes removing material layer by layer, with at least one assigned step between the layers through material removal patterns that include, without limitation, spiral paths, i.e., starting from the center working out or from the outside working inward, parallel drilling, and transitioning to the next machining layer using plunge methods that include, without limitation, axial, spiral, zigzag, or drill points. For example, electrode 206 penetrates the workpiece for one to three millimeters, is then fully withdrawn, and then radially shifted with respect to the perimeter of the first penetration such that another penetration is made removing a portion of the material defining the first penetration such that subsequent penetrations are at least partially overlapped to define a pocket in the workpiece.

Moreover, in operation, each electrode positioning mechanism 202 exercises associated steerable electrode 206 through substantially similar material removal motions in some machining operations substantially simultaneously, through different material removal motions in other machining operations substantially simultaneously, and in some combination of similar and dissimilar material removal motions in yet some other machining operations substantially simultaneously. In the exemplary embodiment, any mode of using just one electrode 206 through using all 17 electrodes simultaneously is available. As such, the radial symmetry of impeller 204 is defined during manufacturing through any combination of multiple arms control through the three axes X, Y, and Z in coordinate system 140.

Figure 7:
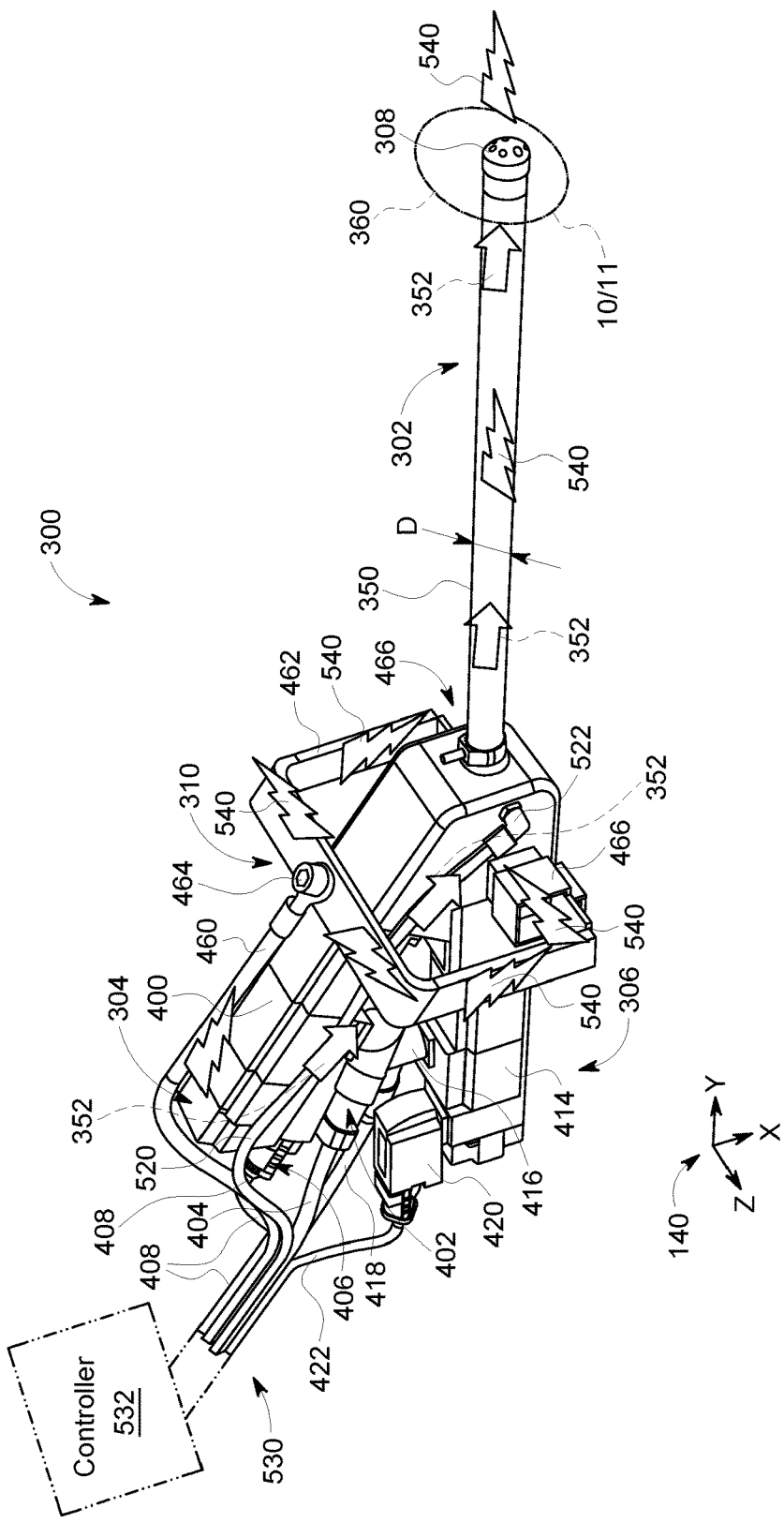
FIG. 7 is a schematic perspective view of a steerable electrode positioning system that may be used with the massive parallel manufacturing system shown in FIGS. 3 through 5.
Figure 8:
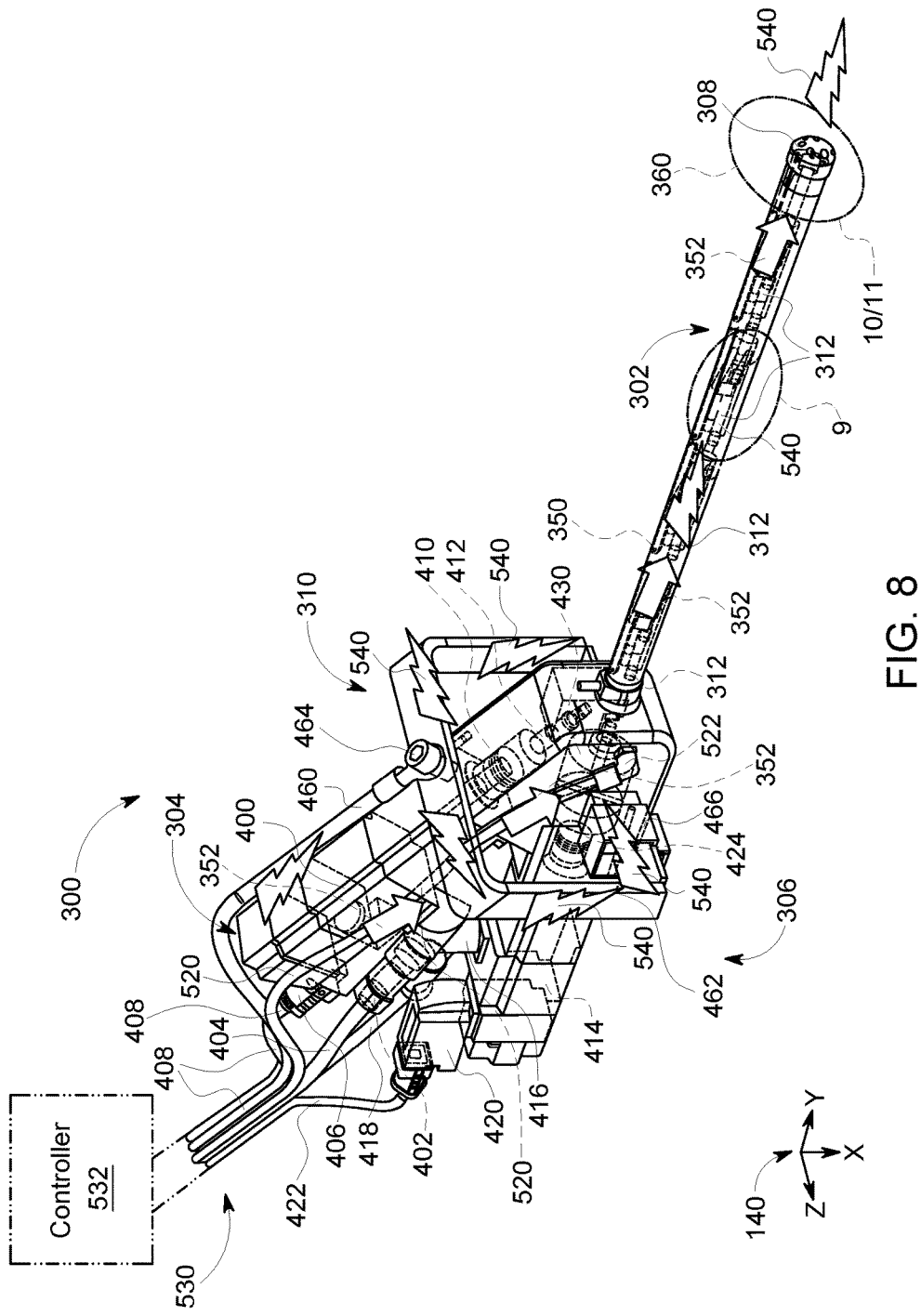
FIG. 8 is a semi-transparent view of the steerable electrode positioning system shown in FIG. 7.

FIG. 7 is a schematic perspective view of steerable electrode positioning system 300 that may be used with massive parallel manufacturing system 200 (shown in FIGS. 3 through 5). FIG. 8 is a semi-transparent view of steerable electrode positioning system 300. Notable configuration differences between steerable electrode 100 and steerable electrode positioned system 300 are accommodated to enable operation of massive parallel manufacturing system 200 as described herein. Steerable electrode positioning system 300 includes an electrode positioning mechanism 302 that substantially operates as a robotic arm. Steerable electrode positioning system 300 also includes an upper servomotor housing 304 for control of, i.e., bending of electrode positioning mechanism 302. Steerable electrode positioning system 300 further includes a lower servomotor housing 306 for rotatably driving a rotatable electrode tip 308. Steerable electrode positioning system 300 also includes an electric power delivery system 310. Each of electrode positioning mechanism 302, upper servomotor housing 304, lower servomotor housing 306, rotatable electrode tip 308, and electric power delivery system 310 are discussed further below. The portion of electrode positioning mechanism 302 proximate rotatable electrode tip 308 is equivalent to first end 137 (shown in FIG. 1). Similarly, the portion of electrode positioning mechanism 302 proximate electric power delivery system 310 is equivalent to second end 138 (shown in FIG. 1).

In the exemplary embodiment, electrode positioning mechanism 302 (the arm) is approximately 75 mm (2.95 (in.) in diameter and rotatable electrode tip 308 is approximately 25-26 mm (1.00 in.) in diameter. Alternatively, electrode positioning mechanism 300 and rotatable electrode tip 308 have any dimensions that enable operation of electrode positioning mechanism 302 as described herein, for example, and without limitation, 5 mm-10 mm (0.2 in.-0.4 in.) in diameter for electrode positioning mechanism 302 for smaller machining tasks.

Figure 9:
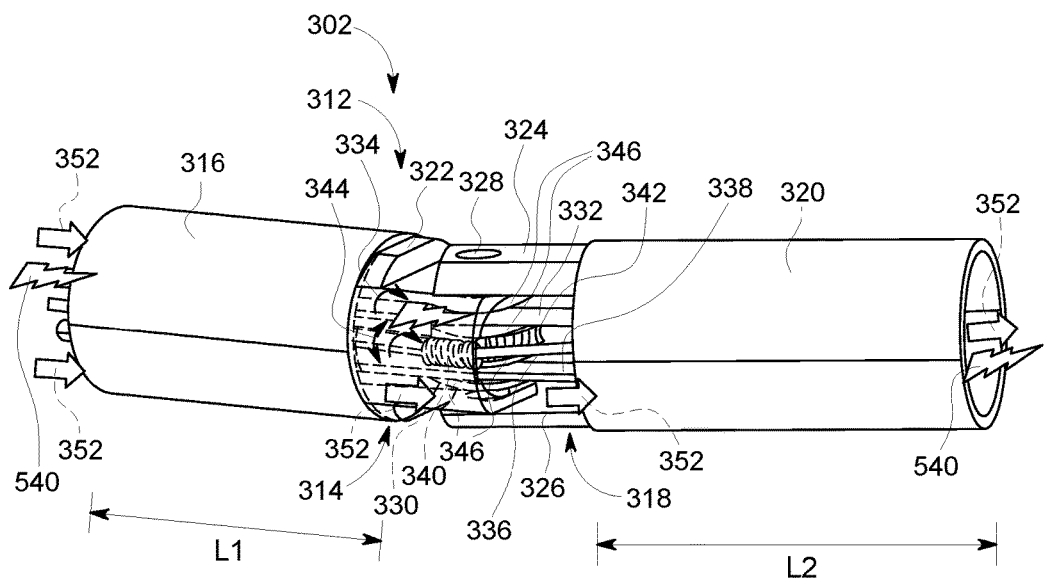
FIG. 9 is a semi-transparent perspective view of an electrode positioning joint mechanism that may be used with the steerable electrode positioning system shown in FIGS. 7 and 8 taken along area 9 shown in FIG. 8.

FIG. 9 is a semi-transparent perspective view of a portion of steerable electrode positioning system 300 (shown in FIGS. 7 and 8), and specifically, electrode positioning mechanism 302, and more specifically, an electrode positioning joint mechanism 312 taken along area 9 (shown in FIG. 8). In the exemplary embodiment, electrode positioning mechanism 302 includes four joint mechanisms 312. Alternatively, electrode positioning mechanism 302 includes any number of joint mechanisms 312 that enables operation of steerable electrode positioning system 300 and electrode positioning mechanism 302 as described herein.

Electrode positioning joint mechanism 312 includes a first portion 314 that includes a first tube 316 and a second portion 318 that includes a second tube 320. First tube 316 and second tube 320 are separated a predetermined distance from each other to reduce a potential for contact that would reduce the flexibility of joint mechanism 312. First tube 316 has a first length $L_1$ and second tube 320 has a second length $L_2$. In some embodiments, first length $L_1$ and second length $L_2$ have substantially similar values for each of joint mechanisms 312. In other embodiments, first length $L_1$ and second length $L_2$ have different values for each of joint mechanisms 312, e.g., successive joint mechanisms 312 from electric power delivery system 310 to rotatable electrode tip 308 have progressively smaller values.

First portion 314 includes at least one structural member 322 that facilitates securing first tube 316 thereto through mechanisms that include, without limitation, friction fits, longitudinal stops, keyed components, adhesives, and fastening hardware (neither shown). Second portion 318 includes a first structural member 324 and a second structural member 326 that facilitate securing second tube 320 thereto through mechanisms that include, without limitation, friction fits, longitudinal stops, keyed components, adhesives, and fastening hardware (neither shown). First structural member 324 and second structural member 326 are similar to structural member 322 with one difference that members 324 and 326 are pivotable through an axle 328. First portion 314 also includes a sleeve 330 that receives axle 328 to pivotably couple first portion 314 to second portion 318.

Electrode positioning joint mechanism 312 also includes a flexible shaft 332 for rotation of electrode tip 308 (shown in FIGS. 7 and 8). In the exemplary embodiment, flexible shaft 332 is approximately 3 mm (0.12 in.) in diameter. Alternatively, flexible shaft 332 has any diameter that enables operation of electrode positioning joint mechanism 312 as described herein. Flexible shaft 332 transmits very high electrical currents, i.e., in the range inclusive of approximately 200 amperes (amps) and approximately 2000 amps to electrically erode the workpiece. Since electrode tip 308 rotates, flexible shaft 332 also rotates with tip 308 as shown be rotation arrow 334. Electrode positioning joint mechanism 312 further includes a plurality of flexible shafts 336 (only one shown) for bending electrode positioning joint mechanism 312. Electrode positioning joint mechanism 312 also includes a tensioning cable 338 that facilitates rigidity of electrode positioning mechanism 302 throughout the range of motion as a hydraulic cylinder (not shown in FIG. 9) pulls tensioning cable 338 to facilitate smooth motion and significantly reduce a potential for a backlash between portions 314 and 318. Predetermined rigidity of electrode positioning mechanism 302 facilitates sufficiently precise positioning of rotatable electrode tip 308 for bulk material removal from the workpiece without inadvertent material removal. Electrode positioning joint mechanism 312 further includes a worm gear 340 and a rotary gear 342 operatively coupled to flexible shaft 336 and axle 328 for bending and unbending electrode positioning joint mechanism 312 through rotation as shown be bi-directional rotation arrow 344. Flexible shaft 336, worm gear 340, rotary gear 342, and axle 328 generate substantially similar effects as leadscrew segments 120 and truss member 114 for electrode positioning system 102 (all shown in FIG. 2). Electrode positioning joint mechanism 312 also includes a plurality of washers 346 that facilitate guided flexing of flexible shaft 332 and tensioning cable 338.

Referring again to FIGS. 7 and 8, electrode positioning mechanism 302 includes a flexible outer sheath 350 (shown as semi-transparent in FIG. 8). Flexible outer sheath 350 is manufactured to facilitate a flow of a dielectric flushing fluid, e.g., and without limitation, deionized water 352 (shown in FIG. 9) with pressures having an inclusive range of approximately 0.6 Megapascals (MPa) (6 bar, 87 pounds per square inch (psi)) and approximately 1 MPa (10 bar, 145 psi), and flow rates having an inclusive range of approximately 10 liters per minute (lpm) (2.64 gallons per minute (gpm)) and approximately 20 lpm (5.28 gpm). As such, flexible outer sheath 350 facilitates operating electrode positioning mechanism 302 as a fluid flushing conduit. In the exemplary embodiment, flexible outer sheath 350 includes a radially inner tube (not shown) and a radially outer protective covering (not shown) extending over the radially inner tube. The radially inner tube is fabricated from any material that enables operation of electrode positioning mechanism 302 as described herein, including, without limitation, nylon reinforced vinyl and rubber. The radially outer protective covering is fabricated from any material that enables operation of electrode positioning mechanism 302 as described herein, including, without limitation, metallic materials such as braided stainless steel. Steerable electrode positioning mechanism 302 has an outer diameter D that is sized to facilitate the above described flushing water flow 352. As described above, D is approximately 75 mm (2.95 inches (in.)). In reference to FIG. 1, flexible outer sheath 350 (not shown in FIG. 1) extends from second end 138 to first end 137.

Figure 10:
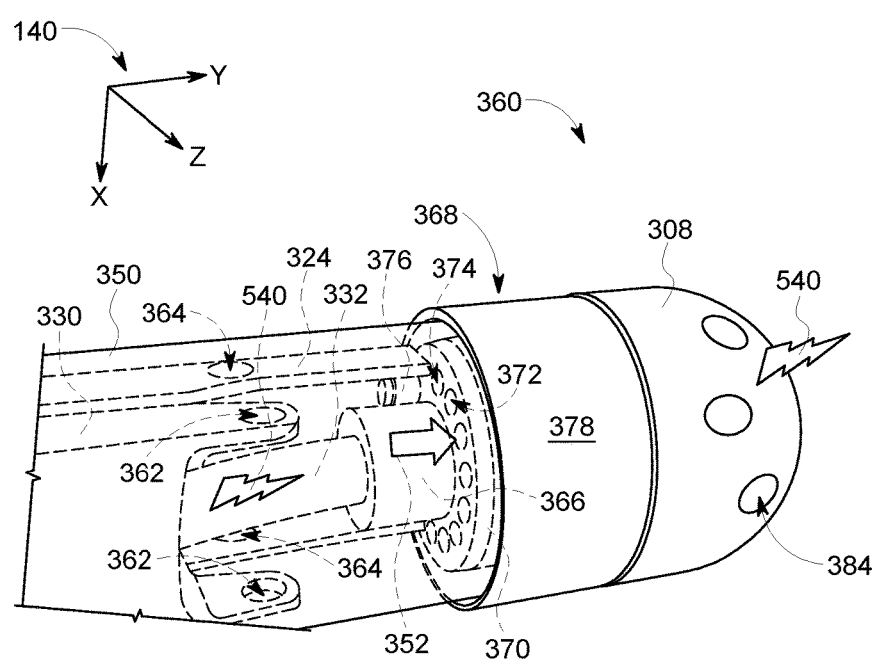
FIG. 10 is a cutaway perspective view of an exemplary electrode tip portion of the steerable electrode positioning system taken along area 10/11 shown in FIGS. 7 and 8.
Figures 11, 12:
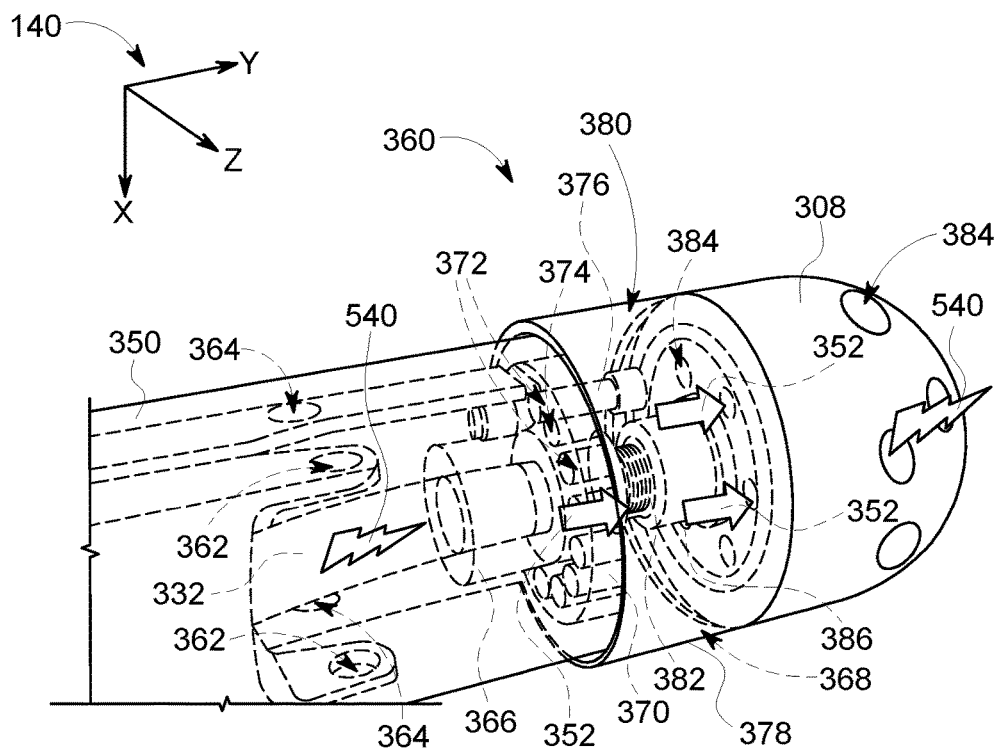
FIG. 11 is a semi-transparent perspective view of the electrode tip portion shown in FIG. 10.
FIG. 12 is a schematic perspective view of an exemplary rotatable electrode tip that may be used with the electrode tip portion shown in FIGS. 10 and 11.

FIG. 10 is a cutaway perspective view of an exemplary electrode tip portion 360 of the steerable electrode positioning system 300 taken along area 10/11 (shown in FIGS. 7 and 8). FIG. 11 is a semi-transparent perspective view of electrode tip portion 360. Electrode tip portion 360 includes at least a portion of a sleeve 330 and at least a portion of a first structural member 324 extending over sleeve 330. Sleeve 330 defines a plurality of axle openings 362 and first structural member 324 defines a plurality of axle openings 364, both sets of openings 362 and 364 align to receive axle 328 (shown in FIG. 9). Electrode tip portion 360 also includes a rotatable hub 366 coupled to flexible shaft 332. Electrode tip portion 360 further includes an electrode tip drum 368 rotatably coupled to hub 366. In the exemplary embodiment, electrode tip portion 360 is approximately 30-40 mm (1.18 in.-1.57 in.) in diameter. Alternatively, electrode tip portion 360 has any diameter than enables operation of steerable electrode positioning system 300 as described herein.

Electrode tip drum 368 includes an electrode tip drum fluid inlet flange 370 rotatably coupled to hub 366 that defines a plurality of fastener passages 372 and a plurality of fluid passages 374. In the exemplary embodiment, fastener passages 372 and fluid passages 374 are alternated with respect to circumferential positioning. Alternatively, fastener passages 372 and fluid passages 374 are positioned in any manner that enables operation of electrode tip portion 360 as described herein. Fastener passages 372 receive a fastener 376 and fluid passages 374 channel flushing fluid flow 352 therethrough. Electrode tip drum 368 includes a drum shell 378 that defines a drum chamber 380 therein. Drum chamber 380 is coupled in flow communication with fluid passages 374, where drum chamber 380 receives flushing fluid flow 352 therein. Fastener 376 extends partially into drum chamber 380. Electrode tip drum 368 further includes a male threaded coupler 382 rotatably coupled to hub 366 and electrode tip drum fluid inlet flange 370.

FIG. 12 is a schematic perspective view of exemplary rotatable electrode tip 308 that may be used with electrode tip portion 360 (shown in FIGS. 10 and 11). Rotatable electrode tip 308 defines a plurality of flushing fluid passages 384. Also, rotatable electrode tip 308 includes a female threaded coupler 386. In the exemplary embodiment, electrode tip 308 is fabricated from tungsten alloy. Alternatively, electrode tip 308 is fabricated from any material that enables operation of electrode tip 308 and electrode tip portion 360 as described herein. Rotatable electrode tip 308 is configured to operate at temperatures proximate approximately 10,000 degrees Celsius (° C.) (18,032 degrees Fahrenheit (° F.)), transmit approximately 200 to 2000 DC amps, rotate within an inclusive range of approximately 1000 revolutions per minute (rpm) to approximately 1500 rpm to perform bulk material removal of hardened materials such as Inconel® from a workpiece.

Referring to FIGS. 10, 11, and 12, rotatable electrode tip 308 is rotatably coupled to electrode tip drum 368 through screwing female threaded coupler 386 onto male threaded coupler 382. Such simple threaded connections facilitate rapid replacement of electrode tip 308 during operation.

Flushing water flow 352 flows from within flexible outer sheath 350 through fluid passages 374 into drum chamber 380 and then exits rotatable electrode tip 308 through flushing fluid passages 384 to flush away molten and solidified material removed from the workpiece. Substantially stationary first structural member 324 is decoupled from rotatable electrode tip drum fluid inlet flange 370 and substantially stationary flexible outer sheath 350 is decoupled from rotatable electrode tip drum fluid inlet flange 370. However, close tolerances are used to reduce a potential for flushing water 352 to leak out of electrode tip portion 360 rather than exit through drum chamber 380 and flushing fluid passages 384.

Figure 13:
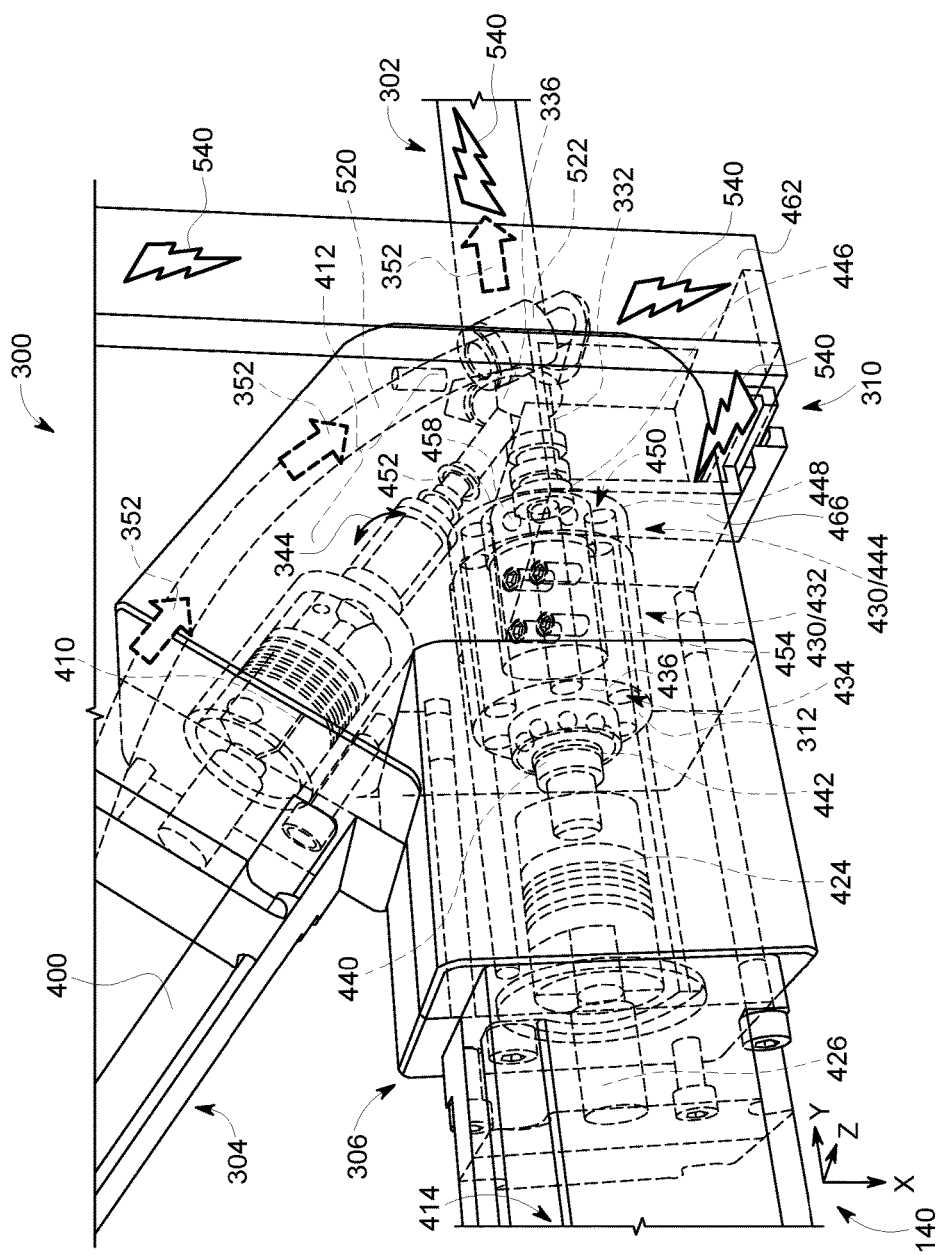
FIG. 13 is semi-transparent perspective view of an upper servomotor housing, a lower servomotor housing, and an electric power delivery system of the portion of the steerable electrode positioning system shown in FIGS. 7 and 8.

FIG. 13 is semi-transparent perspective view of upper servomotor housing 304, lower servomotor housing 306, and electric power delivery system 310 of steerable electrode positioning system 300 (shown in FIGS. 7 and 8). Referring to FIGS. 7, 8, and 13, upper servomotor housing 304 encloses a reversible upper drive device, i.e., servomotor 400 for bending of electrode positioning mechanism 302. Upper servomotor housing 304 includes a first electrical connection enclosure 402 that receives an upper servomotor power cable 404 for delivering electrical power to upper servomotor 400. Upper servomotor housing 304 also includes a second electrical connection enclosure 406 that receives an upper servomotor encoder cable 408 for delivering operating command signals to upper servomotor 400. Upper servomotor housing 304 also encloses an upper flexible coupling 410 that rotatably couples servomotor 400 to flexible shaft 336 through a motion conversion device 412 for bending of electrode positioning mechanism 302. Motion conversion device 412 is any device that transmits and translates reversible rotational motion of upper flexible coupling 410 to flexible shaft 336.

Lower servomotor housing 306 encloses a reversible lower drive device, i.e., servomotor 414 for rotatably driving rotatable electrode tip 308. Lower servomotor housing 306 includes a third electrical connection enclosure 416 that receives a lower servomotor power cable 418 for delivering electrical power to lower servomotor 400. Lower servomotor housing 306 also includes a fourth electrical connection enclosure 420 that receives a lower servomotor encoder cable 422 for delivering operating command signals to lower servomotor 414. Lower servomotor housing 306 also encloses a lower flexible coupling 424 that is rotatably coupled to lower servomotor 414 through a drive shaft 426.

Figure 14:
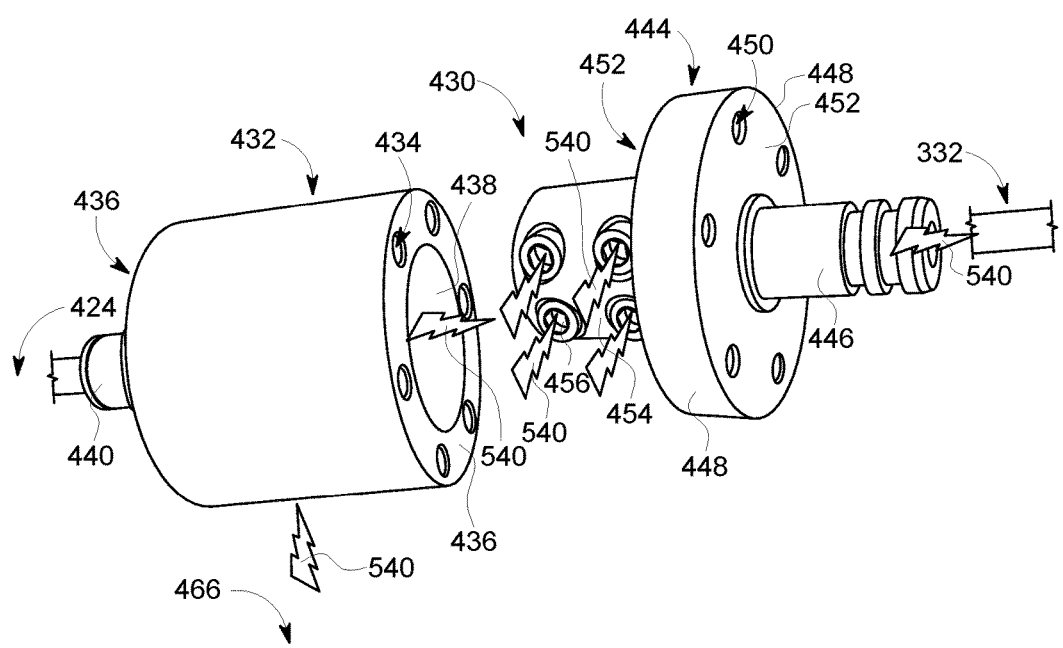
FIG. 14 is an exploded schematic view of a slip ring assembly that may be used with the steerable electrode shown in FIGS. 7, 8, and 13.

FIG. 14 is an exploded schematic view of a slip ring assembly 430 that may be used with steerable electrode positioning system 300 (shown in FIGS. 7, 8, and 13). Referring to FIGS. 7, 8, 13, and 14, lower servomotor housing 306 further encloses slip ring assembly 430. Slip ring assembly 430 is coupled to lower flexible coupling 424 and flexible shaft 332 for electrode tip rotation. Slip ring assembly 430 includes a slip ring drum 432. Slip ring drum 432 defines a plurality of fastener passages 434 in a pair of drum faces 436 and longitudinally extending through drum 432. In the exemplary embodiment, slip ring drum 432 includes six fastener passages 434 that extend the full longitudinal length of drum 432. Alternatively, slip ring drum 432 has any number of fastener passages 434 having any depth within drum 432 that enables operation of slip ring assembly 430 as described herein. Slip ring drum 432 includes an interior contact surface 4380. Slip ring assembly 430 also includes a bearing shaft seat 440 that receives a roller ball bearing 442.

Slip ring assembly 430 further includes a cable coupling portion 444. Cable coupling portion 444 includes a flexible shaft coupler 446 that receives flexible shaft 332. Cable coupling portion 444 also includes a fastener disk 448 that defines a plurality of fastener passages 450 in a pair of faces 452 and longitudinally extending through fastener disk 448. In the exemplary embodiment, fastener disk 448 includes six fastener passages 450 that extend the full longitudinal length of fastener disk 448 to facilitate alignment with fastener passages 434. Alternatively, slip ring drum 432 has any number of fastener passages 434 that enables operation of slip ring assembly 430 as described herein. Cable coupling portion 444 further includes a contact extension 454 that includes four cap screws 456 that contact and couple flexible cable (not shown) from flexible shaft 332 to cable coupling portion 444. Contact extension 454 contacts inner surface 438 of slip ring drum 432. A roller ball bearing 458 is received on flexible shaft coupler 446. Roller ball bearings 442 and 458 substantially electrically insulate slip ring assembly 430.

Referring again to FIGS. 7, 8, and 13, steerable electrode positioning system 300 includes electric power delivery system 310. Electric power delivery system 310 includes an electric current supply conductor 460 (not shown in FIG. 13) coupled to a direct current (DC) power supply (not shown). Electric current supply conductor 460 transmits very high electrical currents, i.e., in the range inclusive of approximately 200 amperes (amps) and approximately 2000 amps with a voltage range inclusive of approximately 10 volts DC (VDC) to approximately 20 VDC to electrically erode the workpiece. In the exemplary embodiment, such a low DC voltage range generates such large electrical currents due to the temporary "short circuit" induced between steerable electrode positioning system 300 and the workpiece undergoing machining to generate the localized plasma. The electrical current is pulsed with an adjustable duty-cycle and current amplitude.

Electric power delivery system 310 also includes a bus bar 462 coupled to electric current supply conductor 460 through an electrical connection 464 (not shown in FIG. 13). Electric power delivery system 310 further includes a plurality of brush holders 466, i.e., one brush holder 466 on each side of bus bar 462. Bus bar 462 distributes current to each of the two brush holders 466 substantially equally at a substantially similar voltage and polarity. A plurality of brushes (not shown) are coupled to each brush holder 466 and slip ring drum 432 of slip ring assembly 430. Bus bar 462, brush holders 466, and the plurality of brushes in each brush holder 466 decreases a current density therethrough to decrease a potential for sparking proximate slip ring drum 432.

Figure 15:
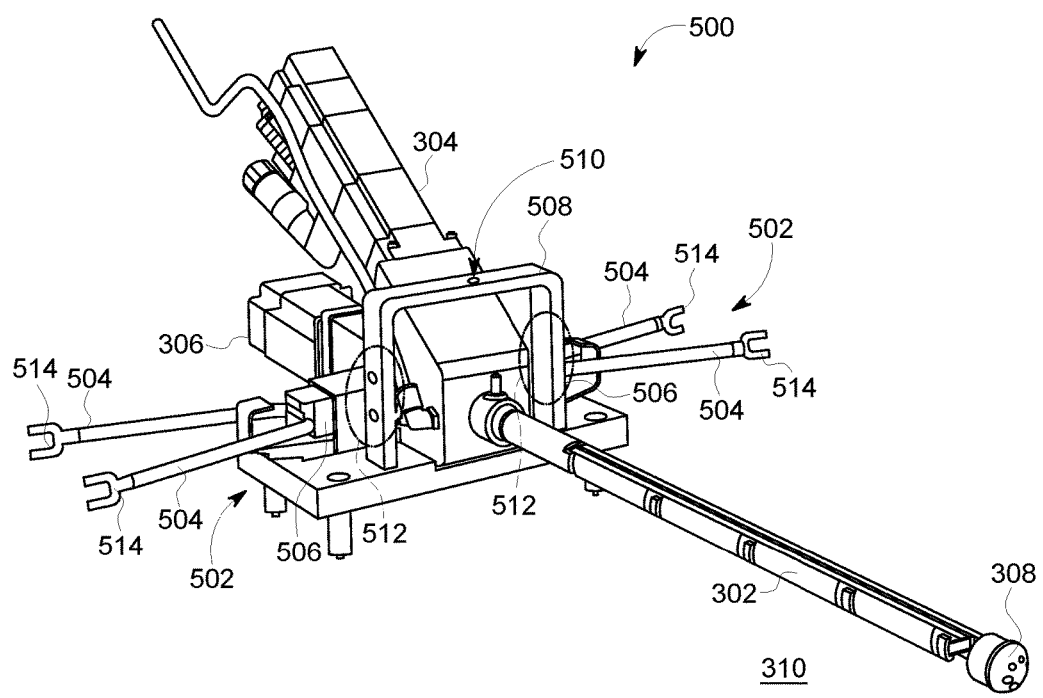
FIG. 15 is a schematic perspective view of an alternative steerable electrode positioning system that may be used with the massive parallel manufacturing system shown in FIGS. 3 through 5.

FIG. 15 is a schematic perspective view of an alternative steerable electrode positioning system 500 that may be used with massive parallel manufacturing system 200 (shown in FIGS. 3 through 5). Steerable electrode positioning system 500 is similar to steerable electrode positioning system 300 (shown in FIGS. 7, 8, and 13) where the most significant differences are associated with an alternative electric power delivery system 502. Rather than a single electric current supply conductor 460 (shown in FIGS. 7 and 8), steerable electrode positioning system 500 includes four electric current supply conductors 504. Electric current supply conductors 504 transmit very high electrical currents, i.e., each conductor 504 in the range inclusive of approximately 50 amps and approximately 500 amps with a voltage range inclusive of approximately 10 volts DC (VDC) to approximately 20 VDC to electrically erode the workpiece. As described above, In the exemplary embodiment, such a low DC voltage range generates such large electrical currents due to the temporary "short circuit" induced between steerable electrode positioning system 300 and the workpiece undergoing machining to generate the localized plasma. The electrical current is pulsed with an adjustable duty-cycle and current amplitude. The currents in conductors 504 are substantially evenly distributed with substantially similar voltages and the same polarities. Each of two conductors 504 on each side of system 500 are directly coupled to the brushes (not shown) in the associated brush holder 506. Electric power delivery system 502 further includes an alternative bus bar 508 with a connection aperture 510 defined to receive electric current supply conductor 460 (shown in FIGS. 7 and 8). Alternative bus bar 508 also defines four apertures 512 that receive lugs (not shown) to couple lug connectors 514 of conductors 504 to bus bar 508.

Referring again to FIGS. 7, 8, and 13, steerable electrode positioning system 300 includes a flushing fluid hose 520 coupled in flow communication with a deionized water source (not shown) and coupled in flow communication with steerable electrode positioning mechanism 302 through a translatable flushing fluid fitting 522. Flushing fluid hose 520 channels deionized water 352 (shown in FIG. 9) with pressures having an inclusive range of approximately 0.6 MPa (6 bar, 87 psi) and approximately 1 MPa (10 bar, 145 psi), and flow rates having an inclusive range of approximately 10 lpm (2.64 gpm) and approximately 20 lpm (5.28 gpm).

Further, referring to FIGS. 7 and 8, steerable electrode positioning system 300 includes a control system 530 that facilitates control of steerable electrode positioning system 300 throughout operation while machining a workpiece. In some embodiments, control system 530 is a broader system that controls operation of a plurality of steerable electrode positioning systems 300 up to massive parallel manufacturing system 200 (shown in FIGS. 3-5) in its entirety. In general, control system 530 facilitates positioning of rotating electrode tip 308 within the workpiece used to form impeller 204 (shown in FIG. 6) with tip 308 exerting substantially zero force on the workpiece, i.e., tip 308 just touches the workpiece to form a localized short circuit condition within the workpiece and then tip 300 is pulled away a few millimeters.

In the exemplary embodiment, control system 530 includes upper servomotor encoder cable 408 coupled to an encoder (not shown) that is in turn coupled to a controller 532. Controller 532 is programmed with sufficient algorithms and instructions to control bending of electrode positioning mechanism 302 through control of upper servomotor 400. Similarly, control system 530 includes lower servomotor encoder cable 422 coupled to an encoder (not shown) that is in turn coupled to controller 532. Controller 532 is programmed with sufficient algorithms and instructions to control rotatably driving rotatable electrode tip 308 through control of lower servomotor 414. In some embodiments, the encoders are embedded within controller 532, either in the form of hardware or software. Control system 530 also includes a plurality of feedback devices, including, without limitation, torque induced through servomotors 400 and 414, rotational velocity of electrode tip 308 in rpm, current transmission to electrode tip 308, and flexible arm position with respect to coordinate system 140. As such, controller 532 and the remainder of control system 530 dynamically alter one or more of a shape and an orientation of one or more electrode positioning mechanism 302 within massive parallel manufacturing system 200 and a value of electric current transmitted through one or more electrode positioning mechanism 302 within massive parallel manufacturing system 200, thereby removing material from the object through a plurality of predetermined transit paths through the object substantially simultaneously.

Referring to FIGS. 7 through 14, in operation, a blank workpiece (not shown) made of a superalloy, e.g., Inconel® is positioned within in massive parallel manufacturing system 200 (shown in FIGS. 3 through 6). One or more electrode tips 308 are rotatably driven through, in series, a respective lower servomotor 414, drive shaft 426, flexible coupling 424, flexible shaft 332, and electrode tip drum 368. Controller 532 regulates the rotational velocity induced by lower servomotor 414 through lower servomotor encoder cable 422 within an inclusive range of approximately 1000 rpm to approximately 1500 rpm.

Also, in operation, electric power 540 is transmitted from an electric power source (not shown) through, in series, electric current supply conductor 460, electrical connection 464, bus bar 462, brush holder 466, brushes (not shown), slip ring drum 432, interior contact surface 438, cap screws 456, flexible shaft 332, to rotating electrode tip 308. Very high electrical currents 540, i.e., in the range inclusive of approximately 200 amps and approximately 2000 amps, are transmitted to rotating electrode tip 308 to electrically erode the workpiece (not shown) to form impeller 204. Current is controlled through controller 532 and a current regulation device (not shown) coupled to controller 532 and conductor 460. Rotatable electrode tip 308 operates at temperatures proximate approximately 10,000° C. (18,032 (° F.), transmit approximately 200 to 2000 DC amps, rotate within an inclusive range of approximately 1000 revolutions per minute (rpm) to approximately 1500 rpm to perform bulk material removal of hardened materials such as Inconel® from a workpiece.

During operation, replacement of electrode tip 308 may be necessary. The old rotatable electrode tip 308 is rotatably uncoupled from electrode tip drum 368 through unscrewing female threaded coupler 386 from male threaded coupler 382. The new tip 308 is rotatable coupled to electrode tip drum 368 through screwing female threaded coupler 386 onto male threaded coupled 382. Such simple threaded connections facilitate routine rapid replacement of electrode tip 308 during operation.

Further, in operation, dielectric flushing and cooling fluid 352 (in the exemplary embodiment, deionized water) is injected from a fluid source (not shown) and a flow regulating device (not shown) through, in series, flushing fluid hose 520 and translatable flushing fluid fitting 522 to steerable electrode positioning mechanism 302, where water 352 is substantially contained through flexible outer sheath 350, i.e., flexible outer sheath acts as a fluid flushing conduit. Deionized water 352 is channeled through each electrode positioning joint mechanism 312 to electrode tip portion 360 including electrode tip drum 368, fluid passages 374 of electrode tip drum fluid inlet flange 370, drum chamber 380, flushing fluid passages 384, and out of electrode tip 308 toward object material removed by rotating electrode tip 308, thereby flushing the melted object material away from electrode tip 308. The flow regulating device and controller 532 regulate deionized water 352 with pressures having an inclusive range of approximately 0.6 MPa (6 bar, 87 psi) and approximately 1 MPa (10 bar, 145 psi), and flow rates having an inclusive range of approximately 10 lpm (2.64 gpm) and approximately 20 lpm (5.28 gpm).

Moreover, in operation, bending of steerable electrode positioning mechanism 302, i.e., arm mechanism is performed through controller 532 regulating upper servomotor 400 through upper servomotor encoder cable 408. Upper servomotor 400 stretches and relaxes flexible shaft 336 for bending electrode positioning joint mechanism 312 to rotate worm gear 340 that in turn rotates rotary gear 342 to pivot second portion 318 of electrode positioning joint mechanism 312 with respect to first portion 314 of electrode positioning joint mechanism 312 for each joint mechanism 312. Bending of each associated electrode positioning joint mechanism 312 is performed, thereby leveraging six degrees of freedom in three-dimensional space through parallel kinematics of a robotic arm. Therefore, steerable electrode positioning system 300 facilitates forming passages and bends within the workpiece with substantially any angle through exercising electrode positioning mechanism 302 to dynamically alter one or more of a shape and an orientation of electrode positioning mechanism 302 through parallel kinematics. As such, exercising each steerable electrode positioning mechanism 302 of massive parallel manufacturing system 200 though a plurality of predetermined transit paths by regulating a position of rotating electrode tip 308 within the workpiece with respect to the pitch direction, the yaw direction, and the roll direction substantially simultaneously through the workpiece is performed through any combination of drilling and pocketing. Such aggressive bulk material removal facilitates timely forming of a roughly-shaped object that resembles the final product, e.g., and without limitation, a pump impeller, where subsequently the roughly-shaped object is transferred to a more precise machining process for final fabrication.

The above described steerable electrodes for electromachining systems and massive parallel manufacturing systems facilitate significant acceleration of manufacturing complex components, such as compressor impellers. Specifically, the steerable electrodes disclosed herein facilitate changing the position and orientation of the electrode dynamically. More specifically, as the electrode penetrates the superalloy material, the bending of the associated electrode arm mechanism is performed through a plurality of links serially coupled through actuated joints, thereby leveraging six degrees of freedom in three-dimensional space through parallel kinematics of a robotic arm. As such, the steerable electrode facilitates forming passages and bends within components for substantially any angle. Also, the electrodes are configured to carry in excess of 500 amperes (amps), thereby increasing the rapidity of material removal during the roughing process. Moreover, the tips of the steerable electrodes are rotatable, thereby further increasing the rate of material removal. The flexible electrode arm mechanism has a predetermined rigidity that facilitates sufficiently precise positioning of the rotatable electrode tip for bulk material removal from the workpiece without inadvertent material removal.

Furthermore, the steerable electrodes are controllable through a computer such that the steerable electrodes are easily adaptable to a large number of components with different configurations and geometries. As such, the electromachining systems described herein facilitate controllable electromachining drilling and pocketing. Also, the use of two independent servomotors, i.e., one servomotor for operating the curvature of the robotic arm and a second servomotor to rotate the electrode facilitates, with minor end effector modifications to the arms and the remainder of the system, the embodiments described herein may be applied to other (manual) machining processes, e.g., polishing of the interior walls of impeller vanes and surface inspection methods including optical, Eddy-current, and x-ray. Also, the massive parallel manufacturing system uses a plurality of steerable electrodes such that electromachining is simultaneously deployed to, e.g., all vanes for an impeller through drilling and pocketing, thereby further decreasing the manufacturing time for the roughing process for such impellers.

An exemplary technical effect of the methods, systems, and apparatus described herein includes at least one of: (a) significantly accelerating the roughing portion of manufacturing of complex components, e.g., compressor impellers; (b) facilitating dynamically changing the position and orientation of the electromachining electrodes as the perform drilling and pocketing material removal, thereby forming passages and bends within components having substantially any angle; (c) using high current, i.e., in excess of 500 amps to rapidly remove material; (d) rotating the tip of the steerable electrode, thereby further increasing the rate of material removal; (e) combining the flexibility of an electrode arm mechanism with sufficient rigidity, thereby precisely positioning the rotatable electrode tip for bulk material removal from the workpiece without inadvertent material removal; (f) adapting the steerable electrode systems for a wide variety of component sizes, configurations, and geometries; and (g) further decreasing the component manufacturing time using a massive parallel manufacturing system including a plurality of steerable electrodes such that electromachining drilling is simultaneously deployed.

Exemplary embodiments of steerable electromachining electrode systems are described above in detail. The steerable electromachining electrode systems, massive parallel manufacturing systems, and methods of operating such systems are not limited to the specific embodiments described herein, but rather, components of systems and/or steps of the methods may be utilized independently and separately from other components and/or steps described herein. For example, the systems, apparatus, and methods may also be used in combination with other systems requiring steerable devices and the associated capabilities, and are not limited to practice with only the facilities, systems and methods as described herein. Rather, the exemplary embodiment can be implemented and utilized in connection with many other applications, e.g., and without limitation, surface inspection methods including optical, Eddy-current, and x-ray, Although specific features of various embodiments of the disclosure may be shown in some drawings and not in others, this is for convenience only. In accordance with the principles of the disclosure, any feature of a drawing may be referenced and/or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electromachining system comprising:
    at least one steerable electrode comprising:
        an electrode positioning mechanism configured to facilitate six degrees of freedom referenced to a pitch axis, a yaw axis, and a roll axis, wherein the three axes are substantially perpendicular to each other, said electrode positioning mechanism comprising a first end; and
        a rotatable electrode tip coupled to said first end,
        wherein said at least one steerable electrode comprises a second end opposite said first end, said second end comprising:
            at least one electrode positioning mechanism drive device; and
            at least one rotatable electrode tip drive device,
            further wherein said electrode positioning mechanism comprises at least one electrode positioning joint mechanism comprising:
            a first portion and a second portion proximate said first portion;
            at least one flexible shaft extending from said first portion to said second portion;
            at least one gear coupled to said at least one flexible shaft;
            at least one axle operatively coupled to said at least one gear, said at least one axle pivotably couples said first portion to said second portion;
            at least one fluid flushing conduit extending from said first portion to said second portion; and
            at least one tensioning cable extending from said first portion to said second portion.

2. The electromachining system in accordance with claim 1, wherein said rotatable electrode tip comprises tungsten alloy.

3. The electromachining system in accordance with claim 1, wherein said rotatable electrode tip is configured to transmit electric current in excess of 500 amperes.

4. The electromachining system in accordance with claim 1, wherein said electromachining system uses at least one of:
    electrical discharge machining (EDM);
    electrochemical discharge machining (ECDM); and
    high-speed electro-erosion (HSEE).

5. The electromachining system in accordance with claim 1, wherein said electrode positioning mechanism comprises:
    a plurality of flexible spline segments extending from said second end to said first end;
    at least one joint mechanism coupled to said plurality of flexible spline segments; and
    at least one truss member coupled to said at least one joint mechanism.

6. The electromachining system in accordance with claim 5, wherein said electrode positioning mechanism further comprises:
    at least one fluid flushing conduit extending from said second end to said first end;
    at least one leadscrew segment coupled to said at least one truss member and coupled to said at least one electrode positioning mechanism drive device; and
    at least one nut bearing threadedly engaged with said at least one joint mechanism.

7. The electromachining system in accordance with claim 6, wherein said electrode positioning mechanism further comprises a flexible outer sheath extending over at least a portion of said plurality of flexible spline segments.

8. The electromachining system in accordance with claim 1, wherein said flexible shaft is coupled to said rotatable electrode tip and configured to induce rotation in said rotatable electrode tip and transmit electric current in excess of 500 amperes to said rotatable electrode tip.

9. A parallel manufacturing system comprising:
    a plurality of steerable electrodes, each steerable electrode of said plurality of steerable electrodes comprising:
        an electrode positioning mechanism configured to facilitate six degrees of freedom referenced to a pitch axis, a yaw axis, and a roll axis, wherein the three axes are substantially perpendicular to each other, said electrode positioning mechanism comprising a first end; and
        a rotatable electrode tip coupled to said first end; and
    at least one controller configured to dynamically alter one or more of:
        a shape and an orientation of said each steerable electrode; and
        a value of electric current transmitted through said each steerable electrode, thereby removing material from an object through a plurality of predetermined transit paths through the object substantially simultaneously,
    wherein said electrode positioning mechanism comprises at least one electrode positioning joint mechanism comprising:
    a first portion and a second portion proximate said first portion;
    at least one flexible shaft extending from said first portion to said second portion;
    at least one gear coupled to said at least one flexible shaft;
    at least one axle operatively coupled to said at least one gear, said at least one axle pivotably couples said first portion to said second portion;
    at least one fluid flushing conduit extending from said first portion to said second portion; and
    at least one tensioning cable extending from said first portion to said second portion.

10. The parallel manufacturing system in accordance with claim 9, wherein each steerable electrode of said plurality of steerable electrodes is configured to transmit electric current in excess of 500 amperes.

11. The parallel manufacturing system in accordance with claim 9, wherein said parallel manufacturing system uses at least one of:
    electrical discharge machining (EDM);
    electrochemical discharge machining (ECDM); and
    high-speed electro-erosion (HSEE).

12. The parallel manufacturing system in accordance with claim 9, wherein said electrode positioning mechanism comprises:
- a second end opposite said first end;
- a plurality of flexible spline segments extending from said second end to said first end;
- at least one joint mechanism coupled to said plurality of flexible spline segments; and
- at least one truss member coupled to said at least one joint mechanism.

13. The parallel manufacturing system in accordance with claim 12, wherein said electrode positioning mechanism further comprises:
- at least one fluid flushing conduit extending from said second end to said first end;
- at least one electrode tip drive device coupled to said rotatable electrode tip;
- at least one leadscrew segment coupled to said at least one truss member and coupled to said at least one electrode positioning mechanism drive device; and
- at least one nut bearing threadedly engaged with said at least one joint mechanism.

14. The parallel manufacturing system in accordance with claim 13 wherein said electrode positioning mechanism further comprises a flexible outer sheath extending over at least a portion of said plurality of flexible spline segments.

15. The parallel manufacturing system in accordance with claim 9, wherein said flexible shaft is coupled to said rotatable electrode tip and configured to induce rotation in said rotatable electrode tip and transmit electric current in excess of 500 amperes to said rotatable electrode tip.

\* \* \* \* \*